United States Patent Office 3,515,012
Patented June 2, 1970

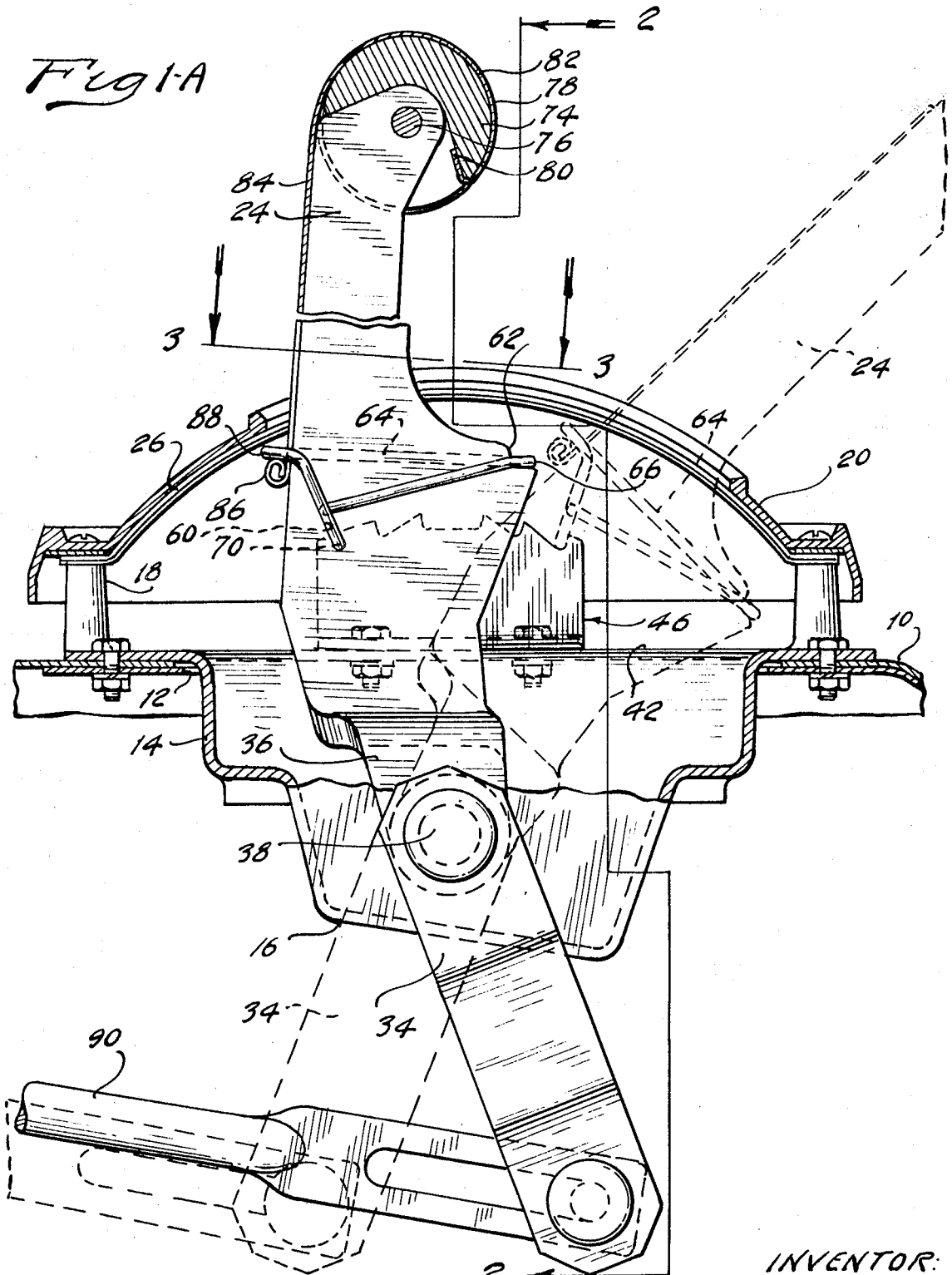

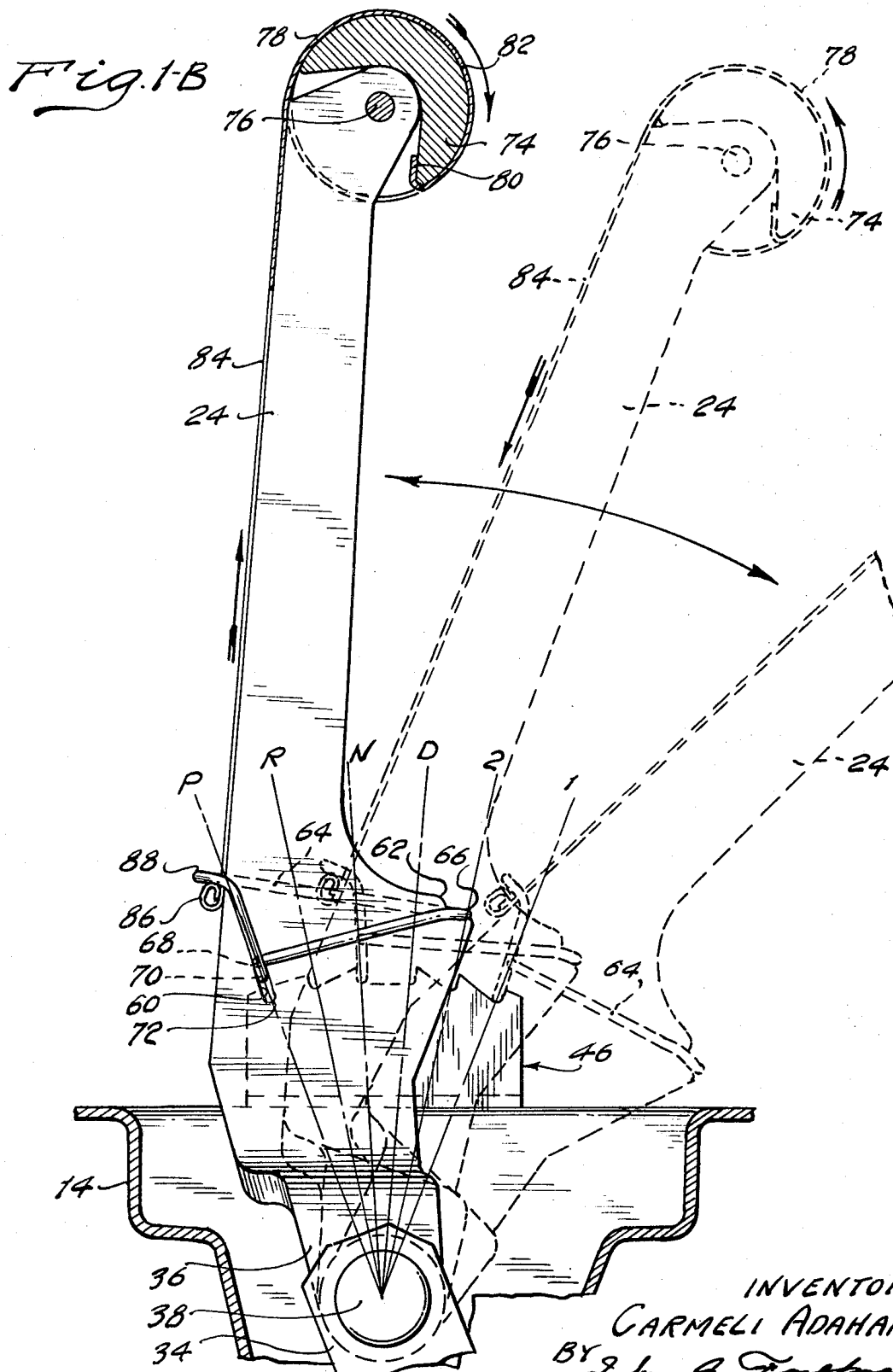

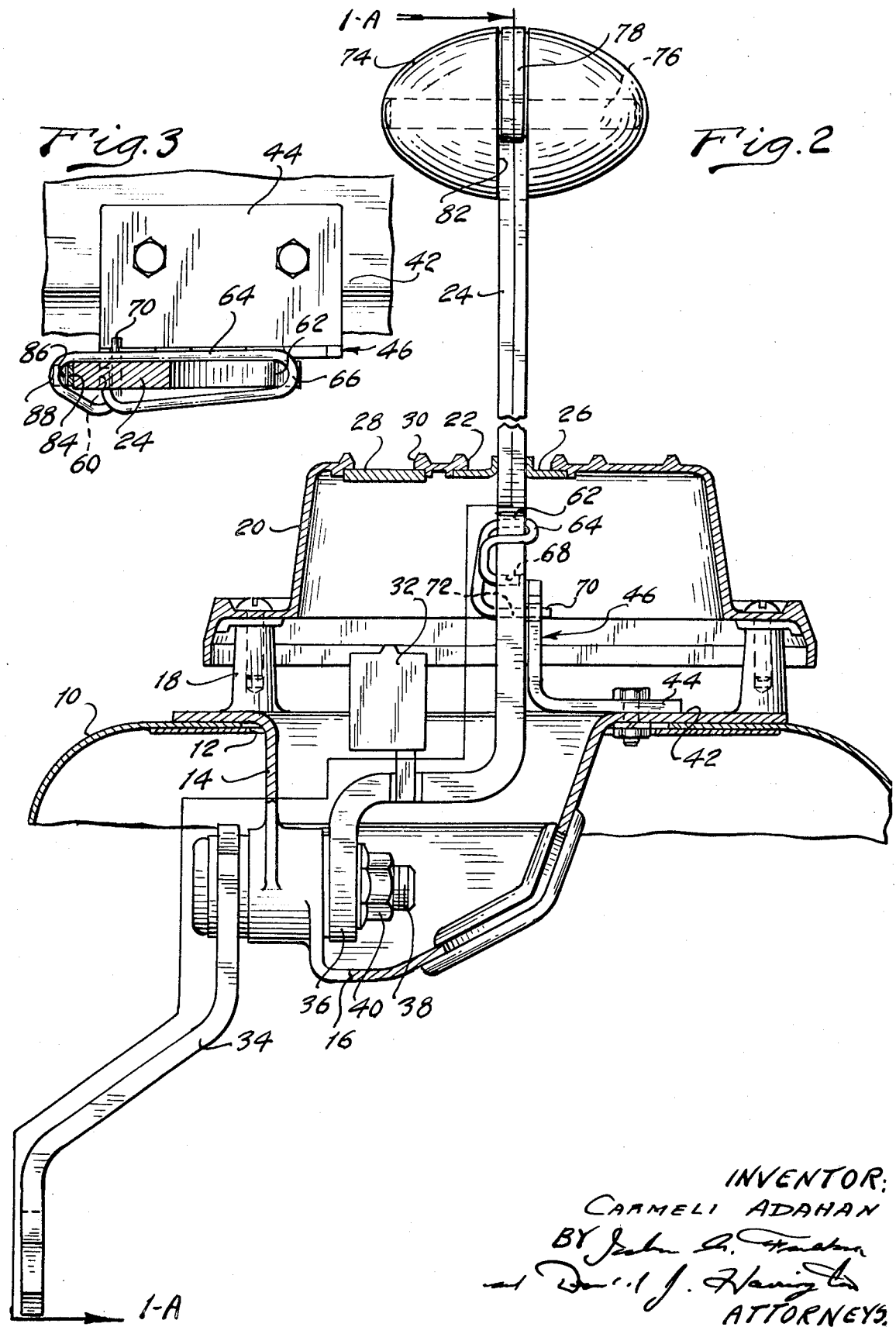

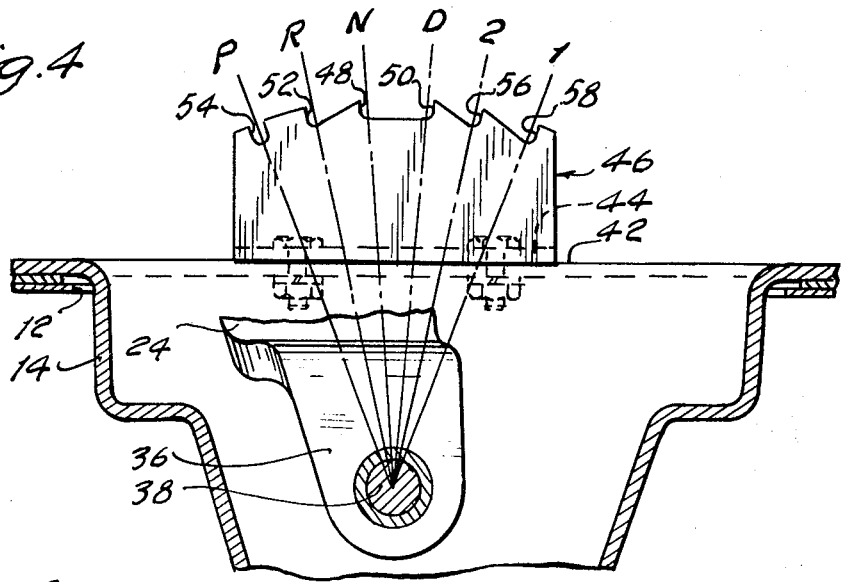
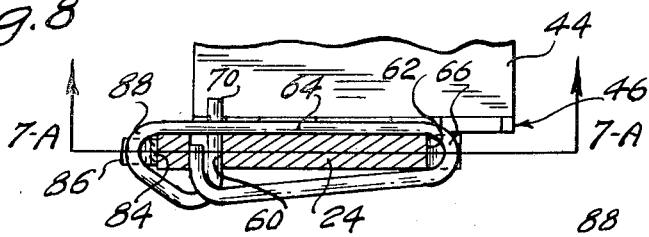
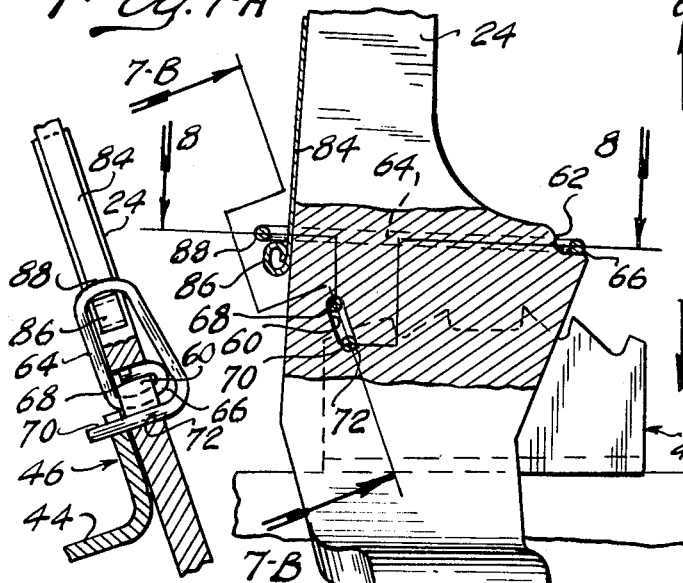
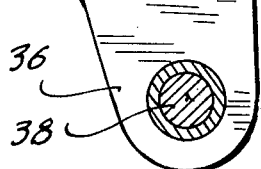

3,515,012
AUTOMATIC TRANSMISSION DRIVE RANGE SELECTOR LEVER
Carmeli Adahan, Dearborn, Mich., assignor to Ford Motor Company, Dearborn, Mich., a corporation of Delaware
Filed Jan. 10, 1969, Ser. No. 790,343
Int. Cl. G05g 9/16
U.S. Cl. 74—473                    16 Claims

ABSTRACT OF THE DISCLOSURE

A manually operated gearshift mechanism for controlling selection of drive ranges for a transmission mechanism in an automotive vehicle driveline, said mechanism comprising a shift lever mounted on a stationary portion of the vehicle chassis, one end of the lever being connected mechanically to the transmission range selector, a handgrip in the form of a rotatable knob at the other end of the lever and a yieldable spring strap engageable with the knob whereby the lever is conditioned for adjustment to any selected range position upon shifting movement of the knob.

GENERAL DESCRIPTION OF THE INVENTION

The improved gearshaft lever mechanism of my invention is adapted to be used with an automotive vehicle driveline which includes an automatic power transmission mechanism having multiple drive ranges. It is common practice in such arrangements to mount the transmission directly on the internal combustion vehicle engine and to locate the transmission directly beneath the floor pan structure of the vehicle body. The driver operated shift lever is mounted on a floor control console, the lever extending through the floor pan structure. The lower end of the shift lever is connected mechanically to a drive ratio selector valve in the automatic transmission. The selector valve controls distribution of control circuit pressure to various fluid pressure operated clutches and brakes in the transmission mechanism, which in turn establish automatic ratio changes in the selected drive range.

In my improved gearshift mechanism a lever is pivoted on a stationary bracket which forms a part of the floor mounted control console, the axis of oscillation being horizontal. A pre-tensioned spring is carried by the shift lever. It includes a pawl portion which registers with a control gate opening formed in a gate plate mounted directly adjacent the lever.

The end of the control lever includes a grip which may be rotated about a horizontal axis. A spring strap connects the grip to the pawl spring, so that when the grip is rotated, the pawl can be lifted out of engagement with the gate plate thereby permitting oscillation of the control lever to any desired position. Ratio selection thus can be achieved with the use of a single control lever operating in a single plane of oscillation.

BRIEF DESCRIPTION OF THE FIGURES OF THE DRAWINGS

FIG. 1A and 1B show in transverse cross section an assembly view of my improved gearshift selector mechanism.

FIG. 2 is an end view of the lever shown in FIG. 1.

FIG. 3 is a cross-sectional view taken along the plane of section line 3—3 of FIG. 1.

FIG. 4 is a detailed view of a side elevation of the gate plate used in the FIG. 1 construction.

FIG. 5 is a plan view of the pawl spring used in the FIG. 1 construction.

FIG. 6 is a side elevation view of the spring of FIG. 5.

FIGS. 7A and 7B are partial assembly views showing the spring of FIGS. 5 and 6 mounted on the lever of FIG. 1.

FIG. 8 is a cross-sectional view taken along the plane of section line 8—8 of FIG. 7A.

PARTICULAR DESCRIPTION OF THE INVENTION

In FIG. 2, numeral 10 designates a portion of the floor mounted gearshift console which forms a part of the vehicle body. It may be located directly adjacent the driver seat in the vehicle passenger compartment. The sheet metal of which the console 10 is formed is comprised of an opening 12 which receives a gearshift selector housing 14. The housing includes a depending portion 16 and a superstructure 18, the latter forming a shoulder which surrounds the opening 12. A suitable cover 20 is secured to the shoulder 18.

The cover 20 is provided with an arcuate opening 22 through which control lever 24 extends. The opening 22 as seen in FIG. 1A is arcuate, and it may be closed by an arcuately formed cover plate 26 slidably disposed thereon as seen in FIG. 2. The inner margin of the opening 22 of the control lever 24 extends through a suitable opening in the cover plate 26. A transparent arcuate plate or lens 28 is mounted in the cover 20 over opening 30. The gearshift lever positions are indicated on the lens 28 at arcuately spaced locations, and a position indicating lamp 32 is carried by a lever 24 for directing a beam of light on the lens 28, thereby selectively illuminating the position indicated on the lens.

The body portion 16 includes a bearing opening that receives a pivot shaft, one end of which is secured to lever portion 34. Lever 24 is offset in a tangential direction as indicated best in FIG. 2 to provide a base 36 which is secured to the other end of the pivot shaft. The end of the pivot shaft is threaded as shown at 38 and is secured to the base 36 by lock nut 40.

The base of the shoulder 18 forms a pedestal 42 on which is secured a horizontal leg 44 of a gate plate 46. The plate 46 includes a vertical portion best indicated in FIG. 4, the margin of which is generally arcuate in form with a center of curvature coinciding with the axis of oscillation of the pivot shaft for lever 24. The margin of the plate 46 has a first shoulder 48 which corresponds to the neutral position for the lever 24. The normal drive position for the lever 24 is determined by shoulder 50 on the gate plate 46. The lever 24 can be moved arcuately between the neutral position and the drive position merely by oscillating the lever 24 about its axis.

The reverse drive position of the lever 24 is determined by shoulder 52 and the park position is determined by recess 54.

The second drive range position is determined by shoulder 56, and the first drive range position is determined by shoulder 58. When the lever assumes the second drive range position, the transmission is conditioned for continuous operation in a first underdrive ratio and automatic upshifts and downshifts from that ratio are inhibited. Similarly, when the lever 24 is in the first drive range position corresponding to shoulder 58, the transmission is in condition for continuous operation in a lower speed ratio as the vehicle is accelerated from a standing start.

The shift lever 24 is provided with an arcuate slot 60 which extends through the lever. The center of curvature of the arcuate slot 60 coincides with shoulder 62 formed on one side of the lever 24. A pawl spring as seen in FIGS. 5 and 6 surrounds the lever 24 as indicated at 64. One end 66 of the spring 64 rests upon the shoulder 62. One end of the spring 64 is turned inwardly in a direction normal to the plane of the lever 24 and is inserted through the slot 60. It rests upon the upper edge 68 of the slot 60. The other end 70 of the spring 64 also extends through the slot 60 and across the periphery of the vertical portion of the gate plate 46. The end 70 normally tends to engage the lower side 72 of the slot 60. The spring 64 is pretensioned so that the ends of the spring normally tend to be separated. The end 70 is adapted to register with the recesses in the periphery of the gate plate 46 which define the shoulders 48 through 58.

A handgrip or knob is mounted on the upper end of the control lever 24 as seen at 74. The knob 74 is provided with a recess into which the end of the control lever 24 extends. A pivot pin 76 extending through the knob is received through an opening in the end of the control lever 24, thereby providing a pivoted connection between the knob and the control lever.

A spring strap 78 surrounds the knob 74. The knob 74 can be provided with a peripheral recess for receiving the spring 78. One end of the spring 78 is turned inwardly as shown at 80 so that it is received within the slot 82 into which the end of the control lever is received.

The strap spring 78 extends tangentially from the periphery of the knob 74 and is positioned directly adjacent the left-hand margin 84 of the control lever 24. The other end 86 of the strap spring encircles one side 88 of the pawl spring as indicated best in FIG. 1.

When the knob 74 is rotated by the operator in a clockwise direction, as seen in FIG. 1, the strap spring 84 will pull the side 86 of the pawl spring upwardly, thereby lifting the end 70 of the pawl spring out of engagement with the gate plate. The lower end of lever portion 34 is connected to one end of a control rod 90 which in turn controls the position of the transmission range selector valve in the transmission control body.

The vehicle operator can select either the neutral position or the drive position when the end 70 of the spring 64 is located between the shoulders 48 and 50. This is done merely by oscillating the control lever 24 in a fore-and-aft direction. If the operator desires to move the control lever 24 to the reverse drive position, it is necessary for him to rotate the knob 74 by a twisting motion of his wrist. This causes the end 70 to be raised over the shoulder 48. When the end 70 is raised in this way, the lever 24 can be oscillated further in a forward direction until the end 70 engages the shoulder 52. At that time the transmission is in condition for reverse-drive operation. The periphery of the gate plate in the region between the shoulders 48 and 50 is formed with a ramp, thereby permitting the end 70 of the spring to fall into place against the shoulder 52.

If the operator desires to shift to the park position, it is necessary for him to again twist the knob 74 to permit the spring to rise away from the gate plate. The operator then oscillates the control lever 24 to the park position which corresponds to the limiting angular position of the control rod. When the spring snaps into place within the recess 54, the operator is assured that the lever is in the park position. The parking brake is connected mechanically to the control rod 90, and the latter assumes a parking position when it is moved to its extreme right-hand position.

The operator may move the control lever 24 from the reverse position to the drive position through the neutral position merely by pulling on the lever 24. It is not necessary to rotate the knob 74 at that time since the ramp portion of the gate between the shoulders 48 and 52 will permit the spring to ratchet over the gate plate. To shift the control lever 24 from the drive position to the second drive range position, it is necessary again to rotate the knob 74 thereby lifting the spring end 70 over the shoulder 50. A similar operation is required to effect movement of the control lever 24 from the second drive range position to the first drive range position. The gate portions between the shoulders 50 and 56 and between the shoulders 56 and 58 are ramped, as indicated best in FIG. 4, so that the spring will snap into place against either the shoulder 56 or 58 as either the second drive range position or the first drive range position is selected.

Having thus described a preferred form of my invention, what I claim and desired to secure by U.S. Letters Patent is:

1. In a transmission selector mechanism for controlling torque ratio changes in an automatic transmission for an automotive vehicle driveline, a control lever mounted for oscillation on a relatively stationary vehicle body portion, said control lever extending in an upward direction, a lower portion of said control lever being connected mechanically to ratio selecting portions of said transmission mechanism, a position indicating gate in the form of a plate mounted on said stationary portion directly adjacent said control lever, gate openings formed on said plate, a pawl carried by said control lever and extending transversely therefrom into registry with said gate openings, a rotatable handgrip mounted on the upward end of said control lever, and a flexible force transmitting element connecting said handgrip to said pawl whereby said pawl is lifted out of registry with said gate openings as said handgrip is oscillated about its pivotal axis thereby permitting movement of said control lever to any desired arcuate position with respect to its pivotal axis.

2. The combination as set forth in claim 1 wherein said flexible force transmitting element is a strap spring connected at one end thereof to said handgrip and at the other end thereof to said pawl, whereby said spring is moved toward said handgrip as the latter is adjusted by the operator upon movement of said pawl out of registry with said gate plate.

3. The combination as set forth in claim 2 wherein said handgrip comprises a knob pivotally mounted on the upward end of said control lever, said flexible force transmitting element surrounding said handgrip and adapted to be partially wound about said handgrip as the latter is adjusted by the vehicle operator thereby causing said pawl to be raised out of registry with said gate plate.

4. The combination as set forth in claim 3 wherein said flexible force transmitting element extends along one side of said control lever, the lower end of said force transmitting element being secured to said pawl and the upper end of said force transmitting element encircling said handgrip and extending along a tangent thereto whereby said force transmitting element is adjusted linearly as the upper portion thereof is adjusted arcuately upon movement of said handgrip.

5. The combination as set forth in claim 4 wherein said pawl comprises a wire spring encircling said control lever intermediate its ends, one end of said spring being anchored to said control lever, and an opening formed in said control lever, the other end of said spring being received through said opening and extending in a direction generally normal to the plane of oscillation of said control lever, said gate plate being mounted in close proximity to said control lever in a plane generally parallel to the plane of oscillation of said control lever, said spring being preloaded to cause said pawl to register with the periphery of said gate plate, the latter being formed with shoulders to form a plurality of limiting positions corresponding to operating portions of said transmission ratio selecting portions.

6. The combination as set forth in claim 3 wherein said pawl comprises a wire spring encircling said control lever intermediate its ends, one end of said spring being anchored to said control lever, and an opening formed in said control lever, the other end of said spring being received through said opening and extending in a direction generally normal to the plane of oscillation of said control lever, said gate plate being mounted in close proximity to said control lever in a plane generally parallel to the plane of oscillation of said control lever, said spring being preloaded to cause said pawl to register with the periphery of said gate plate, the latter being formed with shoulders to form a plurality of limiting positions corresponding to operating portions of said transmission ratio selecting portions.

7. The combination as sest forth in claim 2 wherein said flexible force transmitting element extends along one side of said control lever, the lower end of said force transmitting member being secured to said pawl and the upper end of said force transmitting element encircling said handgrip and extending along a tangent thereto whereby said force transmitting element is adjusted linearly as the upper portion thereof is adjusted arcuately upon movement of said handgrip.

8. The combination as set forth in claim 7 wherein said pawl comprises a wire spring encircling said control lever intermediate its ends, one end of said spring being anchored to said control lever, and an opening formed in said control lever, the other end of said spring being received through said opening and extending in a direction generally normal to the plane of oscillation of said control lever, said gate plate being mounted in close proximity to said control lever in a plane generally parallel to the plane of oscillation of said control lever, said spring being preloaded to cause said pawl to register with the periphery of said gate plate, the latter being formed with shoulders to form a plurality of limiting positions corresponding to operating portions of said transmission ratio selecting portions.

9. The combination as set forth in claim 2 wherein said pawl comprises a wire spring encircling said control lever intermediate its ends, one end of said spring being anchored to said control lever, and an opening formed in said control lever, the other end of said spring being received through said opening and extending in a direction generally normal to the plane of oscillation of said control lever, said gate plate being mounted in close proximity to said control lever in a plane generally parallel to the plane of oscillation of said control lever, said spring being preloaded to cause said pawl to register with the periphery of said gate plate, the latter being formed with shoulders to form a plurality of limiting positionss corresponding to operating portions of said transmission ratio selecting portions.

10. The combination as set forth in claim 1 wherein said handgrip comprises a knob pivotally mounted on the upward end of said control lever, said flexible force transmitting element surrounding said handgrip and adapted to be partially wound about said handgrip as the latter is adjusted by the vehicle operator thereby causing said pawl to be raised out of registry with said gate plate.

11. The combination as set forth in claim 10 wherein said flexible force transmitting element extends along one side of said control lever, the lower end of said force transmitting element being secured to said pawl and the upper end of said force transmitting element encircling said handgrip and extending along a tangent thereto whereby said force transmitting element is adjusted linearly as the upper portion thereof is adjusted arcuately upon movement of said handgrip.

12. The combination as set forth in claim 11 wherein said pawl comprises a wire spring encircling said control lever intermediate its ends, one end of said spring being anchored to said control lever, and an opening formed in said control lever, the other end of said spring being received through said opening and extending in a direction generally normal to the plane of oscillation of said control lever, said gate plate being mounted in close proximity to said control lever in a plane generally parallel to the plane of oscillation of said control lever, said spring being preloaded to cause said pawl to register with the periphery of said gate plate, the latter being formed with shoulders to form a plurality of limiting positions corresponding to operating portions of said transmission ratio selecting portions.

13. The combination as set forth in claim 10 wherein said pawl comprises a wire spring encircling said control lever intermediate its ends, one end of said spring being anchored to said control lever, and an opening formed in said control lever, the other end of said spring being received through said opening and extending in a direction generally normal to the plane of oscillation of said control lever, said gate plate being mounted in close proximity to said control lever in a plane generally parallel to the plane of oscillation of said control lever, said spring being preloaded to cause said pawl to register with the periphery of said gate plate, the latter being formed with shoulders to form a plurality of limiting positions corresponding to operating portions of said transmission ratio selecting portions.

14. The combination as set forth in claim 1 wherein said flexible force transmitting element extends along one side of said control lever, the lower end of said force transmitting member being secured to said pawl and the upper end of said force transmitting element encircling said handgrip and extending along a tangent thereto whereby said force transmitting element is adjusted linearly as the upper portion thereof is adjusted arcuately upon movement of said handgrip.

15. The combination as set forth in claim 14 wherein said pawl comprises a wire spring encircling said control lever intermediate its ends, one end of said spring being anchored to said control lever, and an opening formed in said control lever, the other end of said spring being received through said opening and extending in a direction generally normal to the plane of oscillation of said control lever, said gate plate being mounted in close proximity to said control lever in a plane generally parallel to the plane of oscillation of said control lever, said spring being preloaded to cause said pawl to register with the periphery of said gate plate, the latter being formed with shoulders to form a plurality of limiting positions corresponding to operating portions of said transmission ratio selecting portions.

16. The combination as set forth in claim 1 wherein said pawl comprises a wire spring encircling said control lever intermediate its ends, one end of said spring being anchored to said control lever, and an opening formed in said control lever, the other end of said spring being received through said opening and extending in a direction generally normal to the plane of oscillation of said control lever, said gate plate being mounted in close proximity to said control lever in a plane generally parallel to the plane of oscillation of said control lever, said spring being preloaded to cause said pawl to register with the periphery of said gate plate, the latter being formed with shoulders to form a plurality of limiting positions corresponding to operating portions of said transmission ratio selecting portions.

References Cited

UNITED STATES PATENTS

| | | | |
|---|---|---|---|
| 889,198 | 6/1908 | Burke | 74—536 |
| 3,449,980 | 6/1969 | Hulten | 74—473 |

MILTON KAUFMAN, Primary Examiner

U.S. Cl. X.R.

74—538